(12) United States Patent
Wolford

(10) Patent No.: US 9,254,774 B1
(45) Date of Patent: Feb. 9, 2016

(54) MOVEABLE DATA COLLECTION STATION

(75) Inventor: Glen Michael Wolford, Corinth, TX (US)

(73) Assignee: McClinton Energy Group, LLC, Odessa, TX (US)

( * ) Notice: Subject to any disclaimer, the term of this patent is extended or adjusted under 35 U.S.C. 154(b) by 713 days.

(21) Appl. No.: 13/595,973

(22) Filed: Aug. 27, 2012

Related U.S. Application Data

(60) Provisional application No. 61/528,143, filed on Aug. 26, 2011.

(51) Int. Cl.
*B60P 3/32* (2006.01)
*A61G 3/00* (2006.01)

(52) U.S. Cl.
CPC .... *B60P 3/32* (2013.01); *A61G 3/00* (2013.01)

(58) Field of Classification Search
CPC ............. B01F 13/004; B01F 15/00136; B01F 15/00233; B01F 15/0203; B01F 15/0251; B01F 2003/1257; B01F 3/12; B64D 11/02; B64D 11/003; B64D 2011/0046; B64D 2231/025

USPC ............ 296/24.3, 24.34, 37.6, 190.02, 24.33, 296/155, 161, 182.1, 191; 180/69.4, 311, 180/89.1, 89.17; 280/30, 33.998, 37, 47.18, 280/491.3, 504, 640

See application file for complete search history.

(56) References Cited

U.S. PATENT DOCUMENTS

| | | | | |
|---|---|---|---|---|
| 2,739,833 | A * | 3/1956 | Schenkel et al. | 296/171 |
| 4,261,614 | A * | 4/1981 | Rice | 296/171 |
| 4,538,995 | A * | 9/1985 | Fryer | 434/432 |
| 4,915,435 | A * | 4/1990 | Levine | 296/24.38 |
| 5,897,158 | A * | 4/1999 | Henke et al. | 296/24.3 |
| 6,082,799 | A * | 7/2000 | Marek | 296/24.38 |
| 7,494,823 | B2 * | 2/2009 | Sukumar | 436/174 |

* cited by examiner

*Primary Examiner* — Glenn Dayoan
*Assistant Examiner* — Sunsurraye Westbrook
(74) *Attorney, Agent, or Firm* — Seyfarth Shaw LLP

(57) ABSTRACT

A data collection station with movable second floor walls adjacent stationary first floor walls, wherein the data collection station can have climate control equipment and various devices for data collection while allowing three hundred degree viewing from a load bearing second floor.

16 Claims, 2 Drawing Sheets

MOVEABLE DATA COLLECTION STATION

CROSS REFERENCE TO RELATED APPLICATIONS

The present application claims priority to and the benefit of U.S. Provisional Patent Application Ser. No. 61/528,143 filed on Aug. 26, 2011, entitled "MOVEABLE DATA COLLECTION STATION," which is incorporated herein in its entirety.

FIELD

The present embodiments generally relate to a moveable data collection station that can double in size and provide a three hundred and sixty degree view of a site, such as a drill site or fractionation site, while also providing a compact footprint for transport and limited environmental impact.

BACKGROUND

A need exists for a moveable data collection station that is climate controlled and capable of being doubled in size while providing three hundred and sixty degrees of viewing.

A further need exists for a moveable data collection station with a housing that can be factory built and be loadable on a conventional flatbed or barge for transport.

A further need exists for a moveable data collection station that can be self-propelled with a bus or truck without the need for a special vessel or road permits.

The present embodiments meet these needs.

BRIEF DESCRIPTION OF THE DRAWINGS

The detailed description will be better understood in conjunction with the accompanying drawings as follows.

Figure 1:
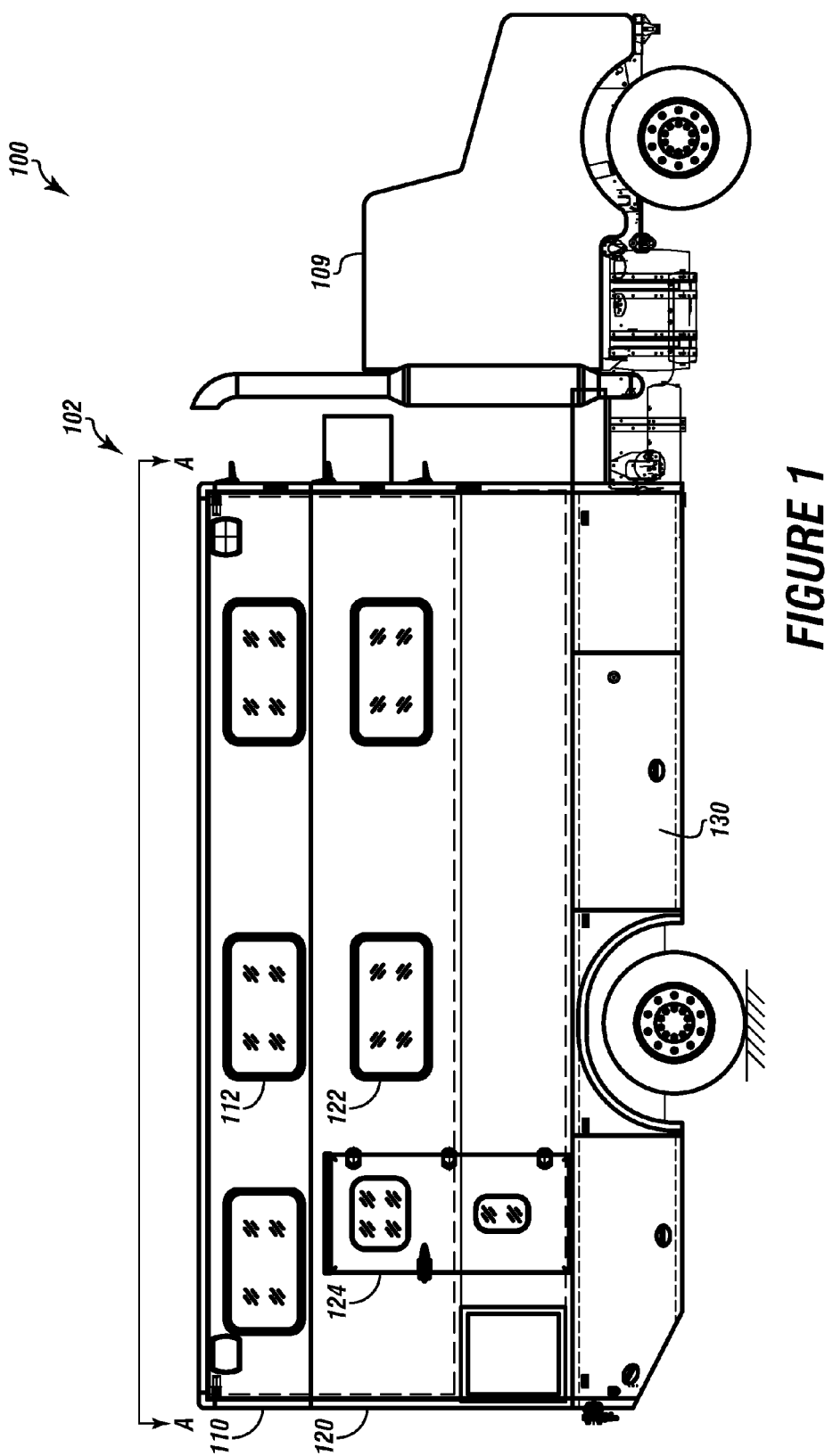
FIG. 1 depicts a side view of the moveable data collection station in a retracted position.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a moveable data collection station that can be skid mounted, truck mounted, barge mounted, ship mounted, or mounted on a self-propelled chassis.

The moveable data collection station can be expandable to allow for bi-level data collection and analysis while providing a three hundred and sixty degree view of a site.

The moveable data collection station can be adaptable to be transported over conventional highways without the need for special permits.

The moveable data collection station can enable a user in the housing to view three hundred and sixty degrees from a climate controlled environment at an elevated level; thereby allowing the user to visually monitor in real-time what is happening at the site. For example, the site can be a drilling site, completion site, or work over site for an oil well.

The moveable data collection station can be a bi-level work station, which can be created in the field with a small footprint.

The moveable data collection station can provide a lower structural impact on highways and roads than currently commercial control sites.

The moveable data collection station can allow for quick modular installation and removal of data collection equipment. As such, the moveable data collection station can provide for increased versatility in the field and use with various pieces of equipment.

The moveable data collection station can provide electricity to the equipment for simultaneously continuous data collection, compilation, storage, and transmission to client devices over a network.

The moveable data collection station can have two levels, allowing communication and computational users to have a quiet, fume-free zone separate from a chemical analysis section. As such, users with allergies or discomfort when breathing chemicals can avoid fumes.

The moveable data collection station can have a base structure. A housing can be mounted over the base structure.

A generator can be connected with the housing for creating electricity. The generator, which can be a motor with a generator unit, can be connected with an on-board fuel supply. The fuel supply can be a diesel fuel tank or natural gas fuel tank having liquefied natural gas or compressed natural gas. The generator can be connected with the base structure.

The generator can provide electricity to a climate control apparatus, such as a heating, ventilation, or air conditioning (HVAC) unit, which can be connected with a heat pump to keep the interior of the housing cool in the summer and warm in the winter.

The generator can be a motor driven generator that produces electricity, such as a motor using diesel fuel, which can run a hydraulic system to operate a generator.

The housing can include a stationary first floor at least partially disposed over the base structure. The stationary first floor can be made of plate steel. Flooring can be placed over the plate metal, such as carpeting or polymer flooring.

Four connected stationary first floor walls can be connected with the stationary first floor. A first floor load bearing room can be connected with the four stationary first floor walls.

A plurality of slide rails can be connected with a surface of the four stationary first floor walls. The slide rails can be connected with an outer side of the stationary first floor walls or an inner slide of the stationary first floor walls.

Four moveable second floor walls can connect to the slide rails. A second floor room can connect to each of the moveable second floor walls to form a top of the moveable data collection station. The moveable second floor walls can nest around the stationary first floor walls.

A second floor roof can rest over the first floor load bearing roof.

A hydraulic lift mechanism can be attached to the base structure on one side and to each of the moveable second floor walls. The hydraulic lift mechanism can raise and lower the moveable second floor walls and second floor roof simultaneously.

The hydraulic lift mechanism can have a plurality of hydraulic cylinders. Each hydraulic cylinder can support a moveable rod connected with one of the moveable second floor walls. A hydraulic pump can be connected with each of the hydraulic cylinders.

A hydraulic fluid can be maintained in a hydraulic reservoir on board the moveable data collection station, and can be connected with the hydraulic pump.

The hydraulic pump can use the hydraulic fluid to engage each of the hydraulic cylinders to lift and lower the moveable second floor walls.

The moveable data collection station can have three hundred and sixty degree viewing windows formed in the moveable second floor walls to provide a three hundred and sixty degree view about the moveable data collection station from within the housing.

A plurality of windows can be installed in the stationary first floor walls to provide viewing.

A plurality of foldable deployable outriggers can be attached to the base structure.

Each outrigger can have a pad for securely engaging a surface proximate to the moveable data collection station to allow at least three points of stabilization for the moveable data collection station. The pads can be removable pads.

The outriggers can be hydraulically operated, pneumatically operated, mechanically operated, or combinations thereof. The outriggers can be telescoping two-piece structures, allowing the outriggers to extend and retract.

A staircase can be formed in the housing and secured to an inner surface of one of the stationary first floor walls to allow users to access a space formed between the second floor roof and the first floor load bearing roof when the moveable second floor walls are lifted by the hydraulic lift mechanism.

A deployable and retractable step ladder can be installed in the moveable data collection station to allow users to enter the housing from a location outside of the housing.

First floor equipment for data collection can be kept in the housing. A first floor surface can be positioned on the first floor for supporting the first floor equipment for data collection.

The first floor equipment for data collection can include a variety of devices including sand sieves, viscosity measurement devices, pH meters, temperature and pressure measuring devices, various means for weighing samples, scales, programmable logic controllers, gas chromatographs, flow meters, mass spectroscopy devices, density/durometer/brittleness measuring devices, or combinations thereof.

A first floor sink connected with a water supply system can be attached to one of the stationary first floor walls.

Second floor equipment for data collection can be installed on the second floor of the moveable data collection station.

The second floor of the moveable data collection station can also include second floor equipment for data storage, data processing, data communication, and telecommunication.

The second floor can have a second floor surface for supporting the second floor equipment.

At least one transmitter/receiver can be on a roof of the moveable data collection station to receive signals from outside of the housing and redirect the signals to equipment within the housing.

The transmitter/receiver can be in communication with a network, such as a satellite network, the Internet, a cellular network, or another type of communication or data network.

In one or more embodiments, the moveable data collection station can be mounted on a truck chassis. A propulsion system with a fuel tank can be used to operate the truck chassis.

A steering system can be connected with the base structure, allowing the base structure and housing to be self-propelled from one location to another location.

In one or more embodiments, the housing can have a safety supply cabinet with various devices, such as a defibrillator.

An eyewash station can be in the housing and attached to one of the stationary first floor walls.

A fire alarm and fire suppression system can be disposed within the housing. The fire suppression system can be CO2 fire extinguisher or an automatic, self-actuating halon system.

An escape hatch can be disposed within the second floor roof. The escape hatch can be three feet by three feet.

Insulation can be placed in the roofs and walls of the moveable data collection station.

Figure 2:
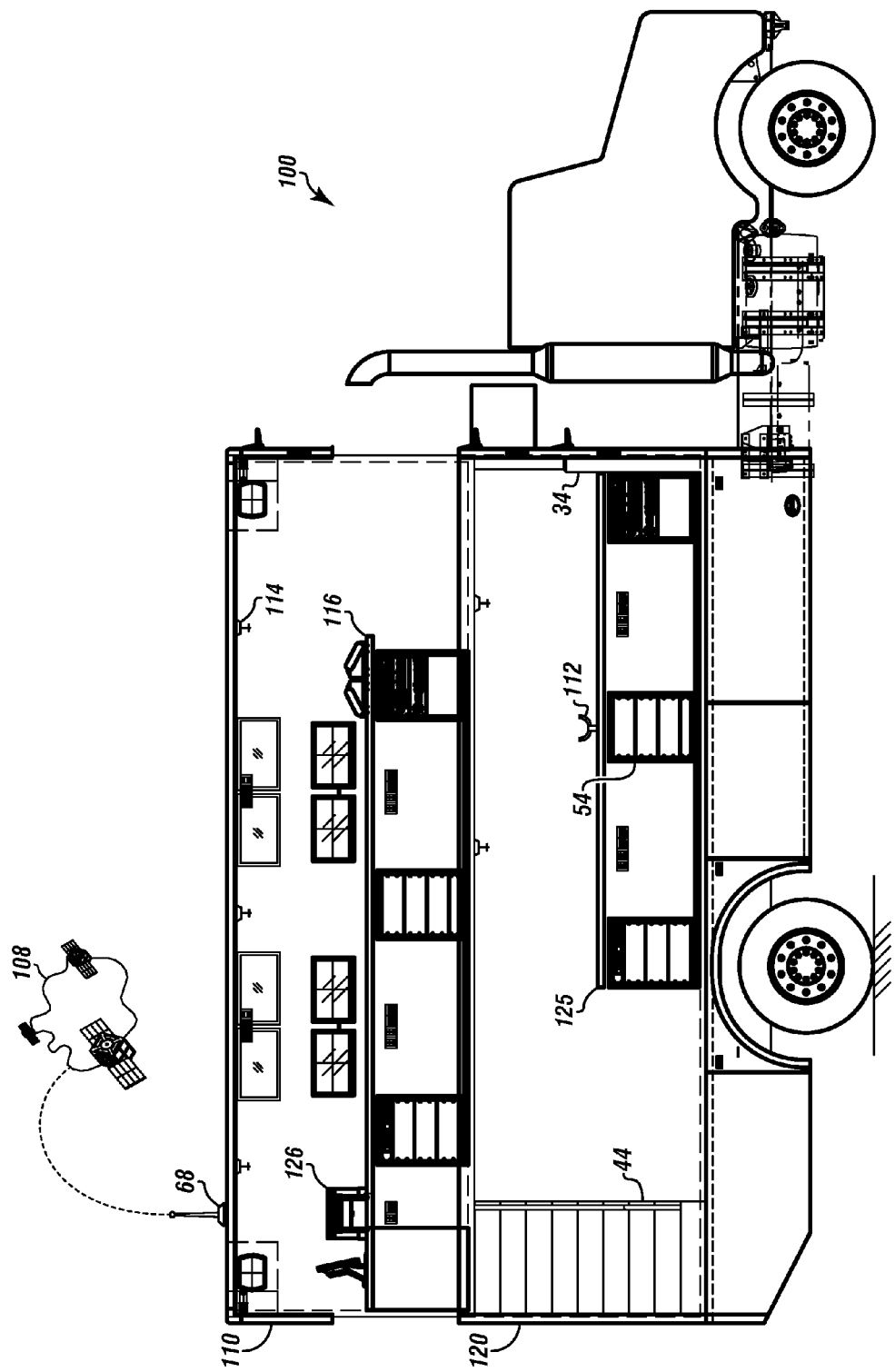
FIG. 2 depicts a cut view, along line A-A of FIG. 1, of the moveable data collection station in an extended position.

Turning now to the Figures, FIG. 1 depicts a side view of the moveable data collection station in a retracted position. FIG. 2 depicts a cut view, along line A-A of FIG. 1, of the moveable data collection station in an extended position.

The moveable data collection station 100 can include a cab 109. The moveable data collection station 100 can also include a two part housing 102 connected with the cab.

The two part housing 102 can include a first section 110 and a second section 120. Each section 110 and 120 can include four walls.

The first section 110 can include one or more windows 112 formed in the walls thereof. The first section 110 can nest within the second section 120.

The second section 120 can include one or more windows 122 formed therein. In addition, one or more doors 124 can be located on the second section 120.

A transmitter/receiver 68 can communicate with a network 108. The transmitter/receiver 68 can be used to convey data from the equipment for data collection 126 to the network 108 for use by a remote user with a client device. The equipment for data collection can include both monitoring equipment and processing equipment.

A staircase 44 can be associated with the first section 110 and the second section 120, allowing for travel between the two sections. The staircase 44 can be made from aluminum or a lightweight steel. The staircase 44 can be hinged or foldable.

The first section 110 can include one or more work stations, such as first work station 116. The first work station 116 can include one or more processing centers, work areas, monitors, or the like. The first work station 116 can be configured to allow one or more people to run fracturing operations and monitor fracturing operations.

The second section 120 can include an eye wash station 112. One or more storage cabinets 54. The second section 120 can also include one or more work stations, such as second work station 125. The second work station 125 can include one or more processing centers, work areas, monitors, or the like. The second work station 125 can be configured to allow one or more people to run fracturing operations and monitor fracturing operations.

The first section 110, the second section 120, or both, can include equipment for data collection 126. The equipment for data collection 126 can include a sand sieve, a viscosity measurement device, a pH meter, a temperature and pressure measuring device, a means for weighing a sample, a programmable logic controller, a gas chromatograph, a flow meter; a mass spectrometer, a density/durometer/brittleness measuring device, or combinations thereof.

The first section 110, the second section 120, or both, can also include a safety supply cabinet, one or more defibrillators, a fire alarm and fire suppression system 114, control equipment, monitoring equipment, communication equipment, or combinations thereof.

The first section 110, the second section 120, or both, can also include a wireline counting system and a hand control in communication with a wireline spool. The hand controls can be used to control the wireline. The hand controls can operate systems that are electric, hydraulic, pneumatic, or combinations thereof.

The first section 110, the second section 120, or both, can also include a control panel configured to induce positive and negative currents through the wireline spool to perform downhole operations via wireline.

The wireline spool can be mounted to the housing or another section of the moveable data collection station and can be configured to be swivel.

A pocket door can be located on the moveable data collection station. The pocket door can be configured to selectively cover at least a section of the wireline spool.

The movable data collection station can also include one or more storage areas 130.

One or more lifting mechanisms 34 can be used to move the first section 110.

While these embodiments have been described with emphasis on the embodiments, it should be understood that within the scope of the appended claims, the embodiments might be practiced other than as specifically described herein.

What is claimed is:

1. A moveable data collection station comprising:
   a. a housing comprising a first section nested within a second section, the second section comprising walls;
   b. a lifting mechanism connected with the first section and the second section, wherein the lifting mechanism is configured to move the first section relative to the second section, the lifting mechanism comprising hydraulic cylinders configured to lift and lower the walls of the second section relative to the first section;
   c. a first work station located within the first section;
   d. a second work station located within the second section; and
   e. equipment for data collection located within the first section, the second section, or combinations thereof.

2. The moveable data collection station of claim 1, wherein the equipment for data collection comprises:
   a. a sand sieve;
   b. a viscosity measurement device;
   c. a pH meter;
   d. a temperature and pressure measuring device;
   e. a means for weighing a sample;
   f. a programmable logic controller;
   g. a gas chromatograph;
   h. a flow meter;
   i. a mass spectrometer;
   j. a density/durometer/brittleness measuring device; or
   k. combinations thereof.

3. The moveable data collection station of claim 1, comprising at least one transmitter/receiver is in communication with a network.

4. The moveable data collection station of claim 1, wherein each of the hydraulic cylinders supports a moveable rod connected with one of the walls of the second section.

5. The moveable data collection station of claim 1, comprising a hydraulic pump connected with each of the hydraulic cylinders.

6. The moveable data collection station of claim 5, comprising a reservoir connected with the hydraulic pump and configured to use hydraulic fluid from the reservoir to engage each of the hydraulic cylinders to move the cylinders to life and lower the walls of the second section.

7. The moveable data collection station of claim 1, comprising a wireline spool and further comprising a wireline counting system and a hand control in communication with the wireline spool.

8. The moveable data collection station of claim 7, wherein the hand control is configured to control the wireline spool by operating a system that is at least one of electric, hydraulic or pneumatic.

9. The moveable data collection station of claim 7, wherein at least one of the first section or the second section comprises a control panel configured to induce positive and negative currents through the wireline spool to perform downhole operations involving the wireline.

10. The moveable data collection station of claim 7, comprising a pocket door configured to selectively cover at least a section of the wireline spool.

11. The moveable data collection station of claim 1, comprising a staircase associated with the first section and the second section and configured to allow a user to travel between the first and second sections.

12. The moveable data collection station of claim 1, wherein the first section comprises walls, slide rails are connected to the walls of the first section, and the slide rails are connected to the walls of the second section.

13. The moveable data collection station of claim 12, wherein the slide rails are connected with an outer side of the walls of the first section.

14. The moveable data collection station of claim 13, wherein the walls of the second section nest around the walls of the first section.

15. The moveable data collection station of claim 12, wherein the slide rails are connected with an inner side of the walls of the first section.

16. A moveable data collection station comprising:
   a. a housing comprising a first section nested within a second section,
   b. a lifting mechanism connected with the first section and the second section, wherein the lifting mechanism is configured to move the first section relative to the second section;
   c. a first work station located within the first section;
   d. a second work station located within the second section;
   e. equipment for data collection located within the first section, the second section, or combinations thereof; and
   f. a wireline spool, a wireline counting system, and a hand control in communication with the wireline spool, the hand control is configured to control the wireline spool by operating a system that is at least one of electric, hydraulic or pneumatic, and at least one of the first section or the second section comprises a control panel configured to induce positive and negative currents through the wireline spool to perform downhole operations involving the wireline.

* * * * *